US009081768B2

(12) United States Patent
Al-Hasan

(10) Patent No.: US 9,081,768 B2
(45) Date of Patent: Jul. 14, 2015

(54) ELECTRONIC HOLDER FOR READING BOOKS

(76) Inventor: Khaled Jafar Al-Hasan, Al-Zahra (KW)

( * ) Notice: Subject to any disclaimer, the term of this patent is extended or adjusted under 35 U.S.C. 154(b) by 282 days.

(21) Appl. No.: 13/103,366

(22) Filed: May 9, 2011

(65) Prior Publication Data

US 2012/0290304 A1    Nov. 15, 2012

(51) Int. Cl.
*H04N 1/04* (2006.01)
*G06F 17/28* (2006.01)
*G10L 13/00* (2006.01)

(52) U.S. Cl.
CPC .............. *G06F 17/289* (2013.01); *G10L 13/00* (2013.01); *H04N 2201/0081* (2013.01); *H04N 2201/0434* (2013.01)

(58) Field of Classification Search
CPC .............. H04N 2201/0081; H04N 2201/0434; H04N 2201/0096; H04N 2201/0476; G06K 2209/01; G06K 9/228; G02B 26/10
USPC .............. 382/305; 358/474; 355/25; 348/376
See application file for complete search history.

(56) References Cited

U.S. PATENT DOCUMENTS

| | | | | |
|---|---|---|---|---|
| 5,145,311 | A * | 9/1992 | Salvucci | 414/592 |
| 5,316,341 | A * | 5/1994 | Schwartz | 281/15.1 |
| 5,344,278 | A * | 9/1994 | Emig, Jr. | 414/622 |
| 5,377,946 | A | 1/1995 | Pannu | |
| 5,430,558 | A | 7/1995 | Sohaei et al. | |
| 5,777,660 | A | 7/1998 | Ard | |
| 5,991,008 | A * | 11/1999 | Li et al. | 355/66 |
| 5,995,245 | A * | 11/1999 | Moro | 358/474 |
| 7,341,456 | B2 | 3/2008 | McAdams et al. | |
| 7,509,087 | B2 * | 3/2009 | Lin | 399/365 |
| 7,551,333 | B2 | 6/2009 | Chien | |
| 7,636,182 | B2 | 12/2009 | Guo | |
| 7,742,953 | B2 | 6/2010 | King et al. | |
| 8,179,563 | B2 * | 5/2012 | King et al. | 358/1.6 |
| 2005/0019072 | A1 * | 1/2005 | Lin | 399/365 |
| 2006/0061806 | A1 * | 3/2006 | King et al. | 358/1.15 |
| 2006/0119901 | A1 * | 6/2006 | Ehrenfeld et al. | 358/474 |
| 2006/0126128 | A1 * | 6/2006 | Ahmed et al. | 358/474 |
| 2006/0152773 | A1 * | 7/2006 | Wu | 358/474 |
| 2008/0158618 | A1 * | 7/2008 | Reese et al. | 358/474 |
| 2008/0165395 | A1 * | 7/2008 | Chen | 358/497 |
| 2009/0021798 | A1 * | 1/2009 | Abahri | 358/474 |
| 2009/0080035 | A1 * | 3/2009 | Downs | 358/473 |
| 2009/0180085 | A1 * | 7/2009 | Rieck et al. | 355/25 |
| 2010/0067068 | A1 * | 3/2010 | Jeong et al. | 358/474 |
| 2010/0123941 | A1 * | 5/2010 | Albahri | 358/474 |
| 2010/0183246 | A1 * | 7/2010 | King et al. | 382/305 |
| 2011/0085211 | A1 * | 4/2011 | King et al. | 358/474 |
| 2011/0242617 | A1 * | 10/2011 | King et al. | 358/474 |
| 2013/0033640 | A1 * | 2/2013 | Lee | 348/376 |

* cited by examiner

*Primary Examiner* — Richemond Dorvil
*Assistant Examiner* — Mark Villena
(74) *Attorney, Agent, or Firm* — Lowe Hauptman & Ham LLP

(57) ABSTRACT

A book support and optical scanner assembly for converting printed text to an audio output includes a support for supporting an open book and a pair of optical scanners adapted to scan opposite pages. The assembly also includes means for moving the scanners from the top of the page to the bottom of a page. Further, both scanners can be rotated off of the book for turning a page. In addition, the assembly includes a text to audio converter for converting the scanned text into spoken words and in one embodiment a translator to translate the scanned text into a pre-selected language.

2 Claims, 5 Drawing Sheets

ELECTRONIC HOLDER FOR READING BOOKS

FIELD OF THE INVENTION

This invention relates to a book support and optical scanner assembly and more particularly to a book support and optical scanner for converting printing text to an audio output.

BACKGROUND FOR THE INVENTION

Book holders and/or supports equipped with optical scanners are known and have been in use for a number of years. For example, a U.S. Pat. No. 5,777,660 of Ard discloses a scanner assembly. As disclosed, a V-shaped scanning head, a book support and a scanner that includes the V-shaped scanning head and the book support. The V-shaped scanning head comprises a pair of scanning surfaces angled relative to each other to form a V-shaped scanning face. An image capturing means preferably in the form of a pair of angled photoelectric detector arrays or a pivotable scanning arrangement is provided for capturing images of both sides of a book, the images being received through the scanning face, Processing circuitry, typically provided in the scanning head, processes the signals received from the image capturing means. The book can be supported on a moveable book support that is capable of adopting a V-shape configuration to support the open book.

A more recent U.S. Pat. No. 7,551,333 of Chien discloses a book scanner for scanning two adjacent pages in a bound volume. The scanner includes a housing, two image scanning units and a conveying device. The housing has two scanning tables connected to each other. An included angle is formed between the two scanning tables and a crest line is thrilled at a connection of the two scanning tables. The two image scanning units are movably disposed in the housing to project a scanning light thorough a window of each scanning table respectively, so as to scan images of the two adjacent pages. The two image scanning units are connected to the conveying device to be supported and moved relative to the corresponding scanning tables in a direction parallel to the crest line so as to be moved simultaneously and to scan the images of the two adjacent pages respectively.

Finally, a U.S. Pat. No. 7,636,182 of Guo discloses a scanning table and scanning device. The scanning table comprises a table surface and two sides. The scanning device comprises a first transparent case provided on the table surface, a second transparent case provided on one side and adjacent to the first transparent case, a first scanning module provided inside the first transparent case, a second scanning module provided inside the second transparent case, and a transporting device for operatively connecting the first scanning module and the second scanning module with each other and scanning the left and right inner pages of a book. With the above arrangement, the user can read on the table while easily scanning the contents of the book without damaging the book.

Notwithstanding the above, it is presently believed that there is a need and a potential commercial market for an improved book support and optical scanner assembly in accordance with the present invention. There should be a demand for such assemblies because they enable individuals to listen to the spoken words from a book without using their eyes and enable those with impaired eyesight to benefit and/or enjoy the printed word.

In addition to the above, an assembly in accordance with the present invention enables a reader to read a text in any position and at any time. Such assemblies also provide a rapid automated transition from one page to the next. Further, one embodiment of the invention enables an individual to listen to a book in one language even though it is written in another language.

BRIEF SUMMARY OF THE INVENTION

In essence, the present invention contemplates a novel book support and optical scanner assembly for converting printed matter taken from a book into an audio output so that an individual can listen to the read words. The book support and scanner assembly comprises or consists of a book support, table, inclined plane or the like for supporting an open book in the proximity of an individual. A pair of optical scanners including a neon light associated with each of said scanners for scanning opposite pages of the book supported by the book support. The assembly also includes means for moving each of the scanners from a top of a page to a bottom of the page and for switching from a first scanner at the bottom of a page to a second scanner at the top of an opposite page as well as from the bottom of an opposite page to the top of the first page. The latter is normally accomplished manually by the individual listening to the words.

The invention will now be described in connection with the accompanying drawings wherein like reference numerals have been used to indicate like parts.

DESCRIPTION OF THE PREFERRED EMBODIMENTS OF THE INVENTION

Figure 1:
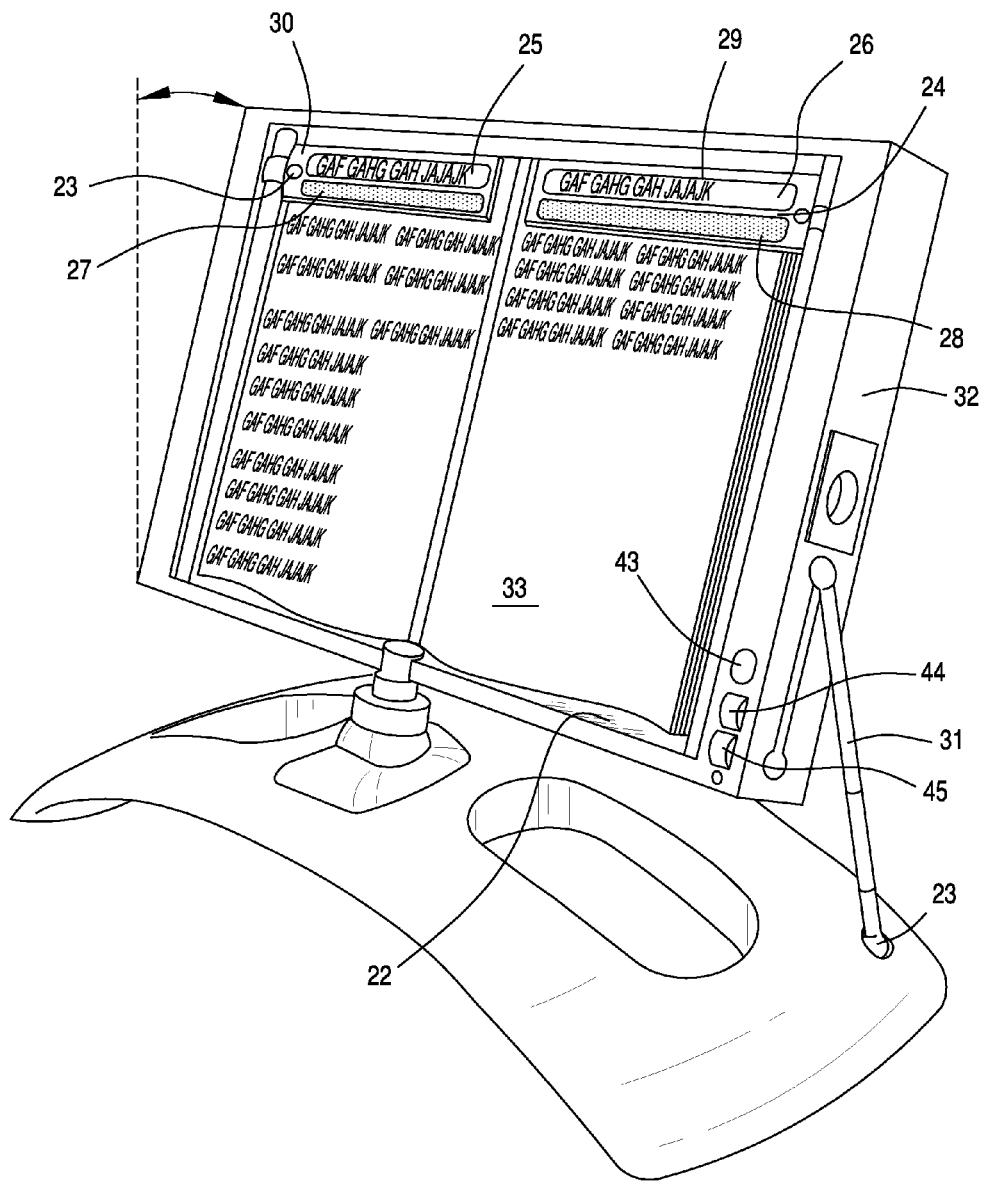
FIG. 1 is a perspective view of a book support/optical scanner assembly in accordance with a first embodiment of the invention.
Figure 2:
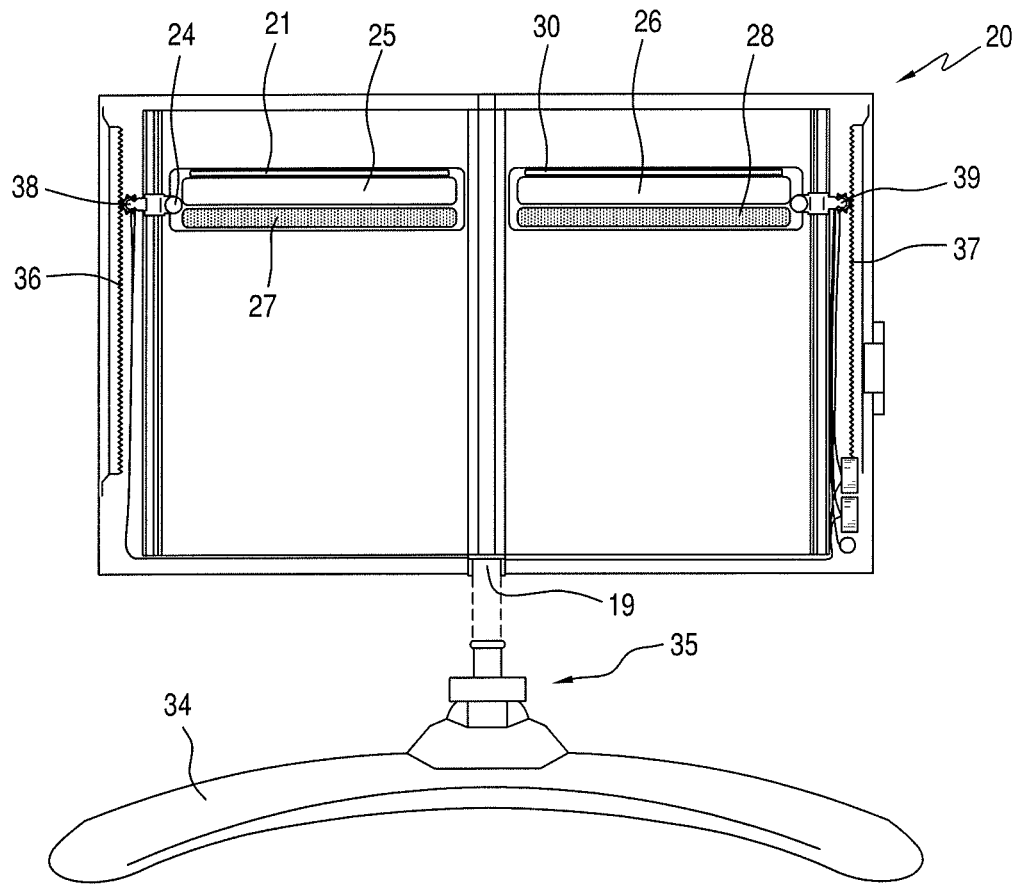
FIG. 2 is a front elevational view of the book support/optical scanner shown in FIG. 1.
Figure 3:
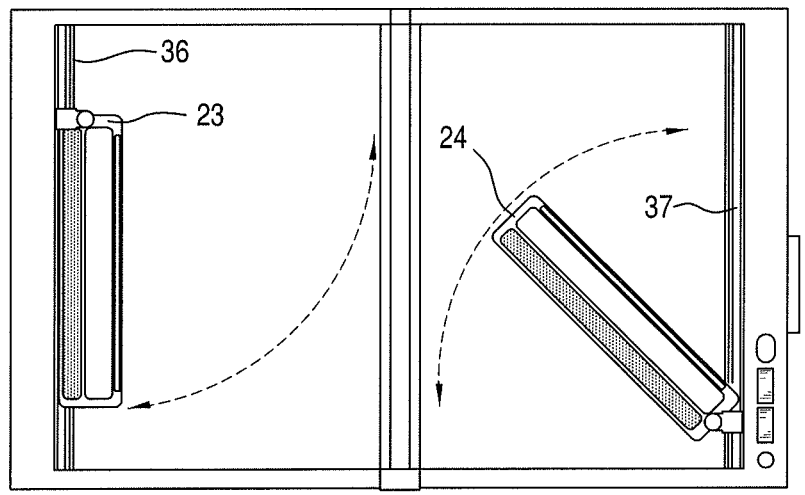
FIG. 3 is a front elevational view of the book support/optical scanner shown in FIGS. 1 and 2, but illustrating the movement of the scanner to facilitate turning of a page.

As illustrated in FIGS. 1-3 a book support/optical scanner assembly 20 includes a book support 22 and a pair of optical scanners 23 and 24. Each of the scanners 23 and 24 includes an electronic scanner 25, 26, a neon light 27, 28 and a magnifier 29 and 30. As shown in FIG. 1, the book support 22 includes a housing 32 that is adapted to receive and hold or position an open book 33 on an upper surface thereof. The housing 32 also includes a suitable support member 31 on one side thereof to fix the angle of inclination that is convenient for an individual.

Referring now to FIG. 2, the book support 22 includes a base 34 for holding the support/scanner assembly 20 above an individual's lap or table and a universal joint 35 plus connection 35' allows the book support 22 to be tilted at an appropriate angle for the convenience of a reader who may want to scan the text as the scanner moves from the top to the bottom of a page. Each of the scanners 23 and 24 is guided by a rod or track 36 and 37 and moved down a page by a gears 38 and 39 respectively. The gears 38 and 39 are driven by a pair of motors 40, 40' (shown in FIG. 4) conventional mechanisms).

As shown in FIG. 3, the pair of optical scanners 23 and 24 can be rotated off of the pages of a book to facilitate turning a page by the individual when the second scanner 24 reaches the bottom of the opposite page. In a preferred embodiment of the invention, the structural elements of the book support 22 include its housing 32 and base 34 which are preferably made of wrought light metal as for example aluminum. The use of wrought like metal provides more flexibility and allows a user to mold it to fit their body. The base may be covered with leather to fit comfortably across a human body when the individual is sitting or laying down.

The size of the book support and scanning assembly 20 may vary, but is typically 32 cm×26 cm×5 cm. The assembly may also include elastic means 43 (FIG. 3) extending across the center of the book 33, between opposite pages or along the outer periphery of the pages to hold the pages in place. The elastic member on each side of the book is preferred since that tends to hold the book flat to be read by the optical scanner.

As shown in FIG. 1, the assembly 20 includes an on/off switch 43 to turn the support/scanner on or off and a pair of control limit switches 44 and 45. The control limit switches are provided for controlling the movement or speed of the pair of scanners 23 and 24. The two limit switches 44 and 45 have an internal variable resistance to enable an individual to change the speed of the scanners 23 and 24.

Figure 4:
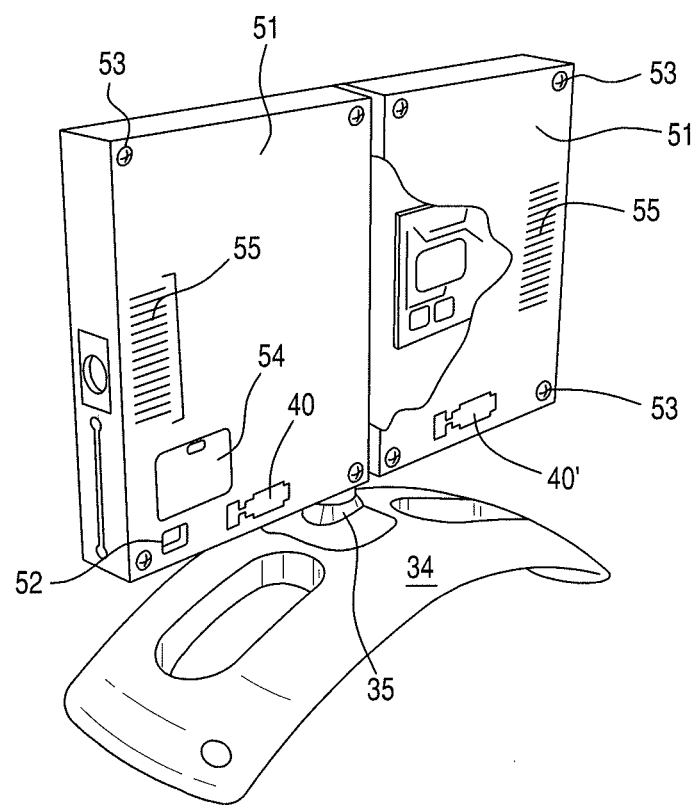
FIG. 4 is a rear view of the book support/optical scanner that illustrates the electric motor and rechargeable battery and an electrical input.

A pair of covers 50, 51 as shown in FIG. 4 cover the back of the housing 32 and combined with the housing 32 to enclose the mechanisms for the assembly 20 including a rechargeable battery disposed under a small door or access to the batteries and plug for connecting to a source of electricity as well as for motors 40, 40'. The covers 50, 51 are held in place by eight (8) Philips head screws 53. The rear covers 51 each include a series of vertically disposed horizontal vents 55 for cooling the motors 40, 40'.

Figure 5:
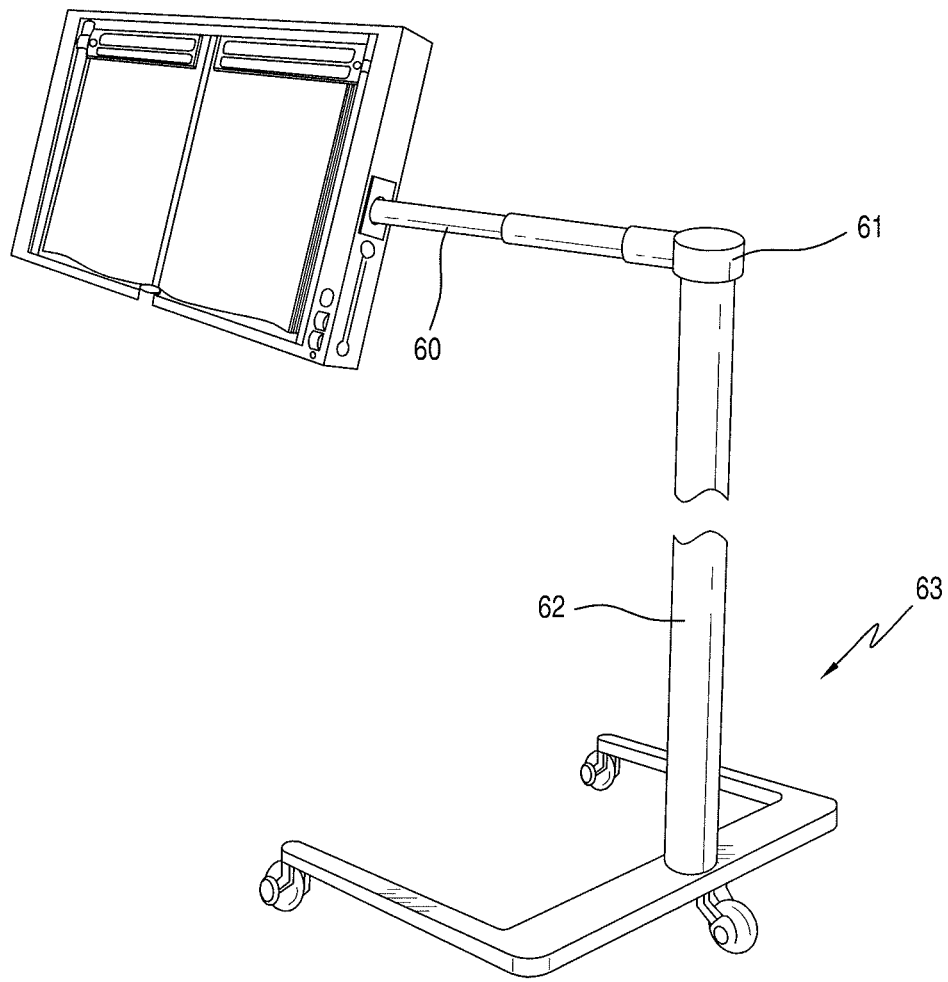
FIG. 5 is a perspective view of a book support/optical scanner in accordance with a second embodiment of the invention.

A second embodiment of the invention, is illustrated in FIG. 5 wherein a book support optical scanner assembly 20 is fixed to the end of a telescoping arm 60 that in turn is rotatable about a rotatable coupling 61. The rotatable coupling 61 is disposed at the top of an extendable vertical post 62. that is fixed as for example by welding to a relatively heavy wheeled frame 63. The wheeled frame may include a U-shaped iron or steel base with 3 or 4 casters that can be positioned on the side of a bed or chair. It is important that the iron or steel base has significant weight to hold the book support/optical scanner 20 in a relatively steady state without a risk of falling over. The height of the vertical post 62 and length of the adjustable arm 60 are then adjusted to accommodate an individual user.

In the operation of a book support/optical scanner assembly 20 (see FIG. 1) the individual user turns the device on by the switch 43 and positions an open book on the support 22. The pair of optical scanners 23 and 24 are positioned at the top of opposite pages and the speed of movement from the top to the bottom of the page is adjusted with switches 44 and 45.

Figure 6:
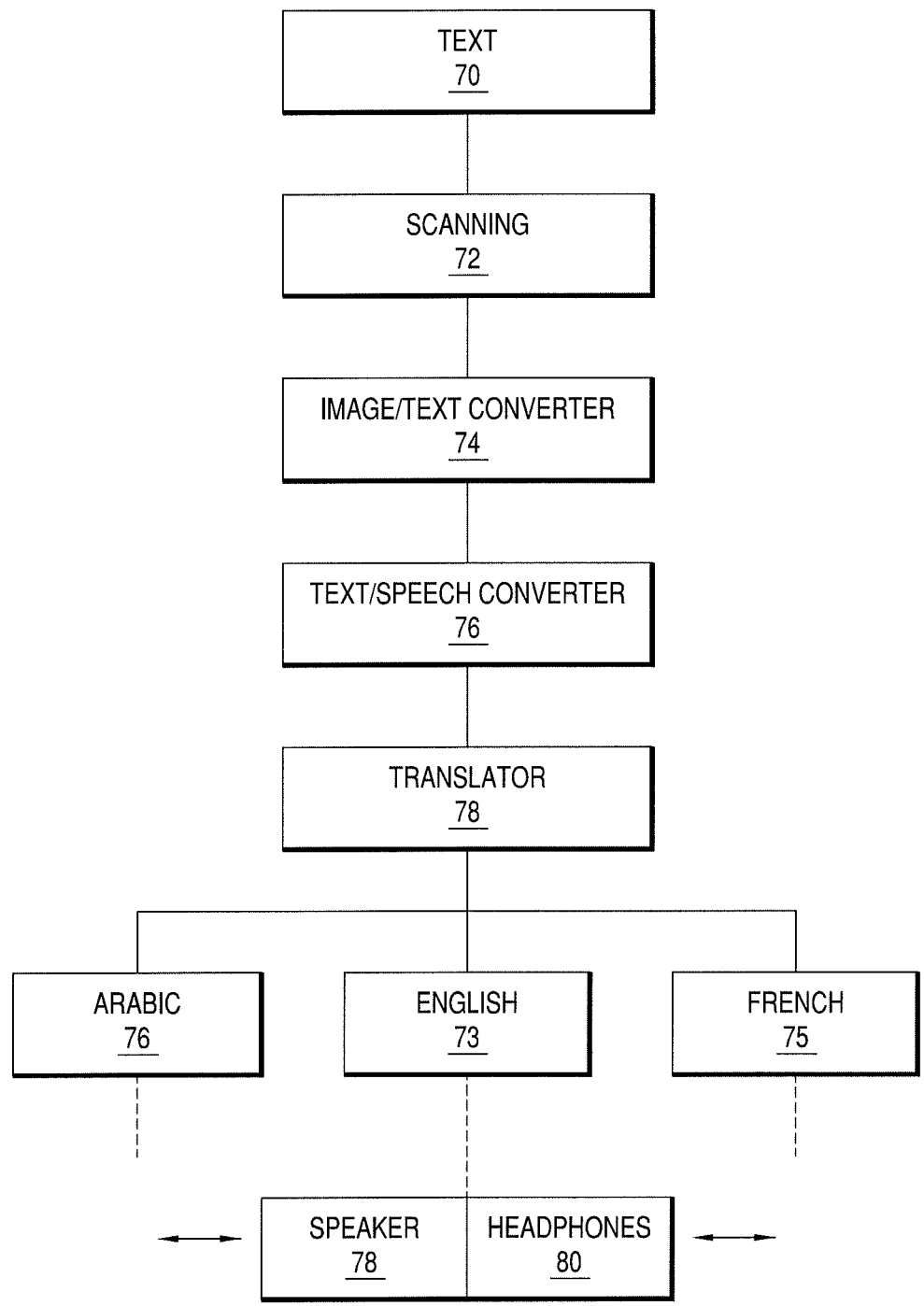
FIG. 6 is a flow chart illustrating a further embodiment of the invention.

Referring now to FIG. 6, the text 70 or image of the text, namely a first page of a book, is scanned by the scanner 23 in a first step 72 and the image is fed to an image/text/converter in step 74. In the next step the text is fed to a text to speech converter 76 and subsequently to a translator 78 that translates the text into a selected language as selected by boxes 71, 73 or 75. The audio output then delivers the translated text through a speaker 79 or earphone 80.

While the invention has been described in accordance with its preferred embodiments it should be recognized that changes and modifications may be made therein without departing from the scope of the appended claims.

What is claimed is:

1. A book support and optical scanner assembly for converting printed material from an open book to the spoken words, said book support and optical scanner assembly consisting of:

a housing and a book support disposed in said housing and adapted to support an open book in the proximity of an individual and said housing consisting of a support member to fix an angle of inclination that is convenient for an individual;

a pair of optical scanners adapted to scan opposite pages of an open book supported on said book support, and consisting of a first magnifier and first neon light for magnifying and illuminating the text being scanned by a first of said pair of optical scanners and a second magnifier, second neon light for magnifying and illuminating the text being scanned by the second of said pair of optical scanners; and at least one control limit switch for controlling the movement or speed of said pair of optical scanners;

wherein each of said pair of optical scanners is rotatable off of a page of a book to facilitate turning a page by an individual when said second scanner reaches the bottom of the opposite page;

a mechanism consisting of a rod or track, a pair of motors and gears driven by said pair of motors for moving a first of said optical scanners from a top of a page to a bottom of the page and for returning said first of said scanners to a top of said page and for moving a second of said scanners from the top of an opposite page to the bottom of said opposite page;

means for converting said scanned text to spoken word and means for dictating the spoken words, and wherein the support member further consists of a telescoping arm removably attached to said housing at one end, and rotatably coupled to a vertical post at an opposing second end, and wherein a U-shaped base having a plurality of casters is attached to an opposing second end of said vertical post.

2. A book support and optical scanner assembly for converting printed material from an open book to spoken words, said book support and optical scanner assembly consisting of:

a housing and a book support disposed on said housing and adapted to support an open book in the proximity of an individual;

a pair of optical scanners adapted to scan opposite pages of an open book supported on said book support, and consisting of a first magnifier and first neon light for magnifying and illuminating the text being scanned by a first of said pair of optical scanners and a second magnifier and second neon light for magnifying and illuminating the text being scanned by the second of said pair of optical scanners; and at least one control limit switch for controlling the movement or speed of said pair of optical scanners;

wherein each of said pair of optical scanners is rotatable off of a page of a book to facilitate turning a page by an individual when said second scanner reaches the bottom of the opposite page;

a mechanism consisting of including a track, a pair of motors and gears driven by said motors for moving a first of said optical scanners from a top of a page to a bottom of the page and for returning said first of said scanners to a top of said page and for moving a second of said scanners from the top of an opposite page to the bottom of said opposite page;

means for translating the scanned text into a pre-selected language; and means for converting said translated text to spoken words and means for dictating the spoken words in said pre-selected language, and further comprising a support member consisting of a telescoping arm removably attached to said housing at one end, and rotatably coupled to a vertical post at an opposing second end, and wherein a U-shaped base having a plurality of casters is attached to an opposing second end of said vertical post.

\* \* \* \* \*